Patented Nov. 12, 1929

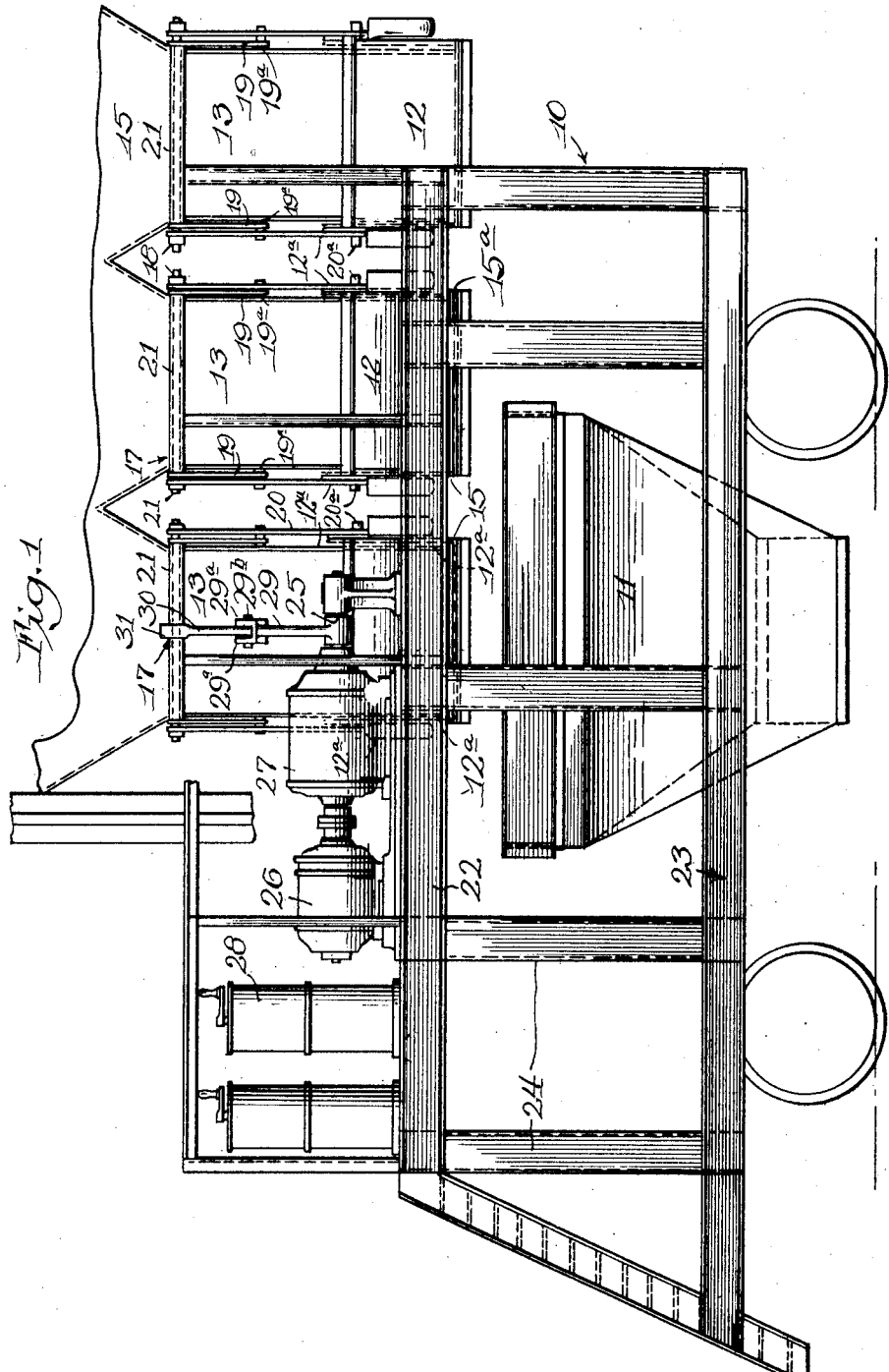

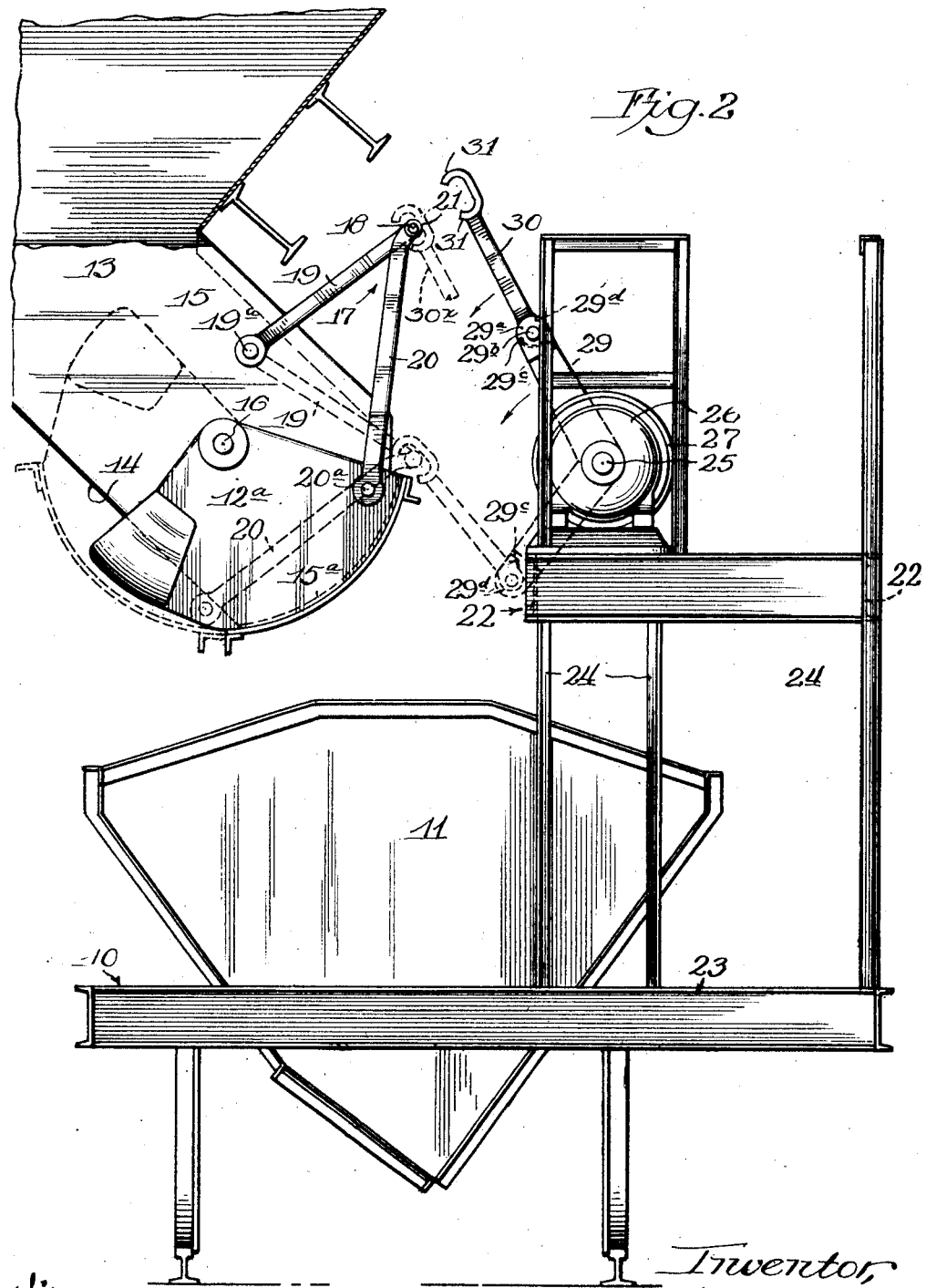

1,735,106

UNITED STATES PATENT OFFICE

ARTHUR J. BOYNTON, OF WINNETKA, ILLINOIS, ASSIGNOR TO H. A. BRASSERT & COMPANY, OF CHICAGO, ILLINOIS, A CORPORATION OF ILLINOIS

POWER-DRIVEN BIN-GATE-ACTUATING DEVICE

Application filed May 26, 1927. Serial No. 194,516.

This invention relates to a power driven bin gate actuating device and consists of the matters hereinafter described and more particularly pointed out in the appended claim.

In blast furnace and similar plants, large quantities of bulk material are stored in bins provided with a plurality of laterally spaced discharge openings each closed by a pivotally mounted gate. The stored material is removed from these bins by scale cars on which the material is accurately weighed and the accuracy of the weighing depends upon the attention given to it by the operator. As the opening of the bin gates is a heavy task and as they have to be opened a number of times during the day, it is desirable to have the scale car equipped with power actuated means for opening said gates.

The object of the present invention is to provide a simple, efficient, and economical power driven bin gate opening device which is adapted to be operated to open a bin gate whenever the scale car is brought to proper position to receive the discharge of the material through the gateway or passage closed by said gate.

In another application for patent, Serial No. 192,771, filed on the 19th day of May, 1927, I described and claimed a bin gate actuating device for use with a bin gate of the upper-cut type, in which the bin gate closes down on top of the inclined bin floor and is swung upwardly away from said floor in its opening movement. The present invention relates to a device of the kind for opening a bin gate of the so-called under-cut type, in which the bin gate closes against the end of the downwardly inclined bin floor and is adapted to be swung upon a pivot back of and below said floor in its opening movement.

In the drawings:—

Figure 1 is a side elevation of a scale car provided with my improved bin gate opening device.

Figure 2 is an end elevation showing the bin gate opening mechanism in position ready to open the bin gate.

Referring now to that embodiment of my invention illustrated in drawings:—10 indicates a scale car of familiar construction having a hopper 11, which as illustrated in the drawings, is in position opposite one of a plurality of laterally spaced bin gates 12, closing the bin discharge chutes 13. Each discharge chute is defined by the bin floor 14, inclined downwardly at a sharp angle to permit the ready discharge of the contents of the bin into the hopper of the scale car, and by vertical side walls 15, 15. The bin gate, as hereinbefore stated, is of the under-cut type, as shown in Figure 2. The bin gate is circular in vertical section and has laterally spaced counterbalanced side members or arms $12^a$, $12^a$, (see Figure 1) which embrace the side walls 15, 15 of the chute 13. The said side walls have curved ends $15^a$, $15^a$ concentric with the curvature of and closing against the gate 12 and the gate arms $12^a$ are pivoted on studs 16 carried at the common center by the side walls 15 of the chute. The gate 12 is opened by swinging it downwardly on the studs 16 from the position shown in full lines in Figure 2 to the position shown in dotted lines therein.

On each gate I provide a device 17 to be engaged to open or close the gate. This device consists of a horizontal rod 18 extending transversely above the gate and supported in eyes at the upper ends of pairs of arms 19, 20 at each side of the chute, with the arm 19 of each pair pivoted to a stud $19^a$ on the side wall of the chute and the arm 20 pivoted to a stud $20^a$ on the side member $12^a$ of the bin gate. A bushing 21 is preferably mounted on the rod 18 for anti-friction purposes when engaged by the power driven gate opening device presently to be described.

22 indicates an elevated platform, extending longitudinally of the scale car and supported on the frame 23 thereof by uprights 24, 24 somewhat to one side of the median line of the hopper 11.

25 indicates a shaft extending longitudinally of the car and mounted in suitable bearing on the platform 22. Said shaft is operated by an electric motor 26 to which it is connected by a gear reduction set 27. The motor is in circuit with a reversible motor control 28 to which it is connected by electric conductors, not necessary to be shown. The electric connections and motor are such that the motor may be reversed by the control 28 to drive the shaft in either direction.

On the shaft 25 is fixed a crank arm 29 and to the end of said crank arm is pivoted a jaw member 30 capable of a limited swinging movement in a vertical plane relative to the crank arm. As illustrated in the drawings, the crank arm has a forked end, the tines $29^a$ of which carry a pin $29^b$ providing the pivot for the jaw member 30 and the said tines and the pivoted end of the jaw member have on their proximate faces correlated stops or shoulders $29^c$, $29^d$ which limit the pivotal movement between the two.

The jaw member 30 has at its free end spaced jaws 31, 31. The crank arm 29 and the jaw member 30 are so designed in length with reference to the height of the scale car platform as compared to the height of the bin gate, that the jaws 31 at one limit of the movement of the jaw member 30 relative to the crank arm 29 will stand in a position ready to embrace, but spaced away from, the rod 18 of the catch device 17 on the bin gate, when the hopper 11 of a car is in position to receive the discharge from the chute closed by said gate. This is the normal position of the crank arm 29 and jaw member 30, as shown in Figure 2, where the jaws 31 are above and away from the catch device 17 a sufficient distance to permit the scale car to pass the bins with ample clearance between the jaw member and the catch device.

The operation of the bin gate actuating device is as follows:— After the car has been brought to proper position to receive the discharge from the chute 13 of a bin, the motor 26 is started by means of the controller 28. The shaft 25 is thus rotated and the crank arm 29 with the jaw member 30 is caused to swing in the direction of the arrow (to the left) as shown in Figure 2, to bring the jaws 31 to embracing position (indicated by the dotted lines at $30^x$) with the rod 18 of the catch device 17 connected to the bin gate. The continued rotation of the shaft, by reason of the pivotal relation between the jaw member 30 and the crank arm 29, brings the top jaw 31 into active engagement with the rod 18 (or its anti-friction sleeve 21) of the catch device and through the arms 19, 20 thereof, forces the bin gate 12 to swing on its pivots 16 from closed position, indicated by the full lines in Figure 2, to open position, indicated by the dotted lines. At the open position of the gate the correlated limiting stops $29^c$, $29^d$ on the pivoted end of the jaw member 30 and on the tines of the forked end of the crank arm 29, limit the further swinging movement of the jaw member with reference to the crank arm. A reverse movement of the shaft 25 will cause the lower jaw 31 of the jaw member to engage the rod 18 of the catch device, swing the gate back to closed position and withdraw the jaw member 29 from engaging position with the catch device, so that the car may be moved beyond the bin gate in either direction.

It will be observed from examination of Figure 2 that by the arrangement of the side frames of the catch device comprised of the pairs of arms 19, 20 pivotally engaged with the rod 18, with one arm (19) pivoted to the side wall of the chute and the other (20) pivoted to the side member of the gate, a positive and direct, tangential, downward thrust is imparted to the gate at the beginning of its opening movement when greatest opposition to that movement is encountered by reason of the load on the gate.

Manifestly by reason of the reversibility of the shaft, a vibratory movement of the gate may be produced when desired.

While in describing by invention I have referred to several details of mechanical construction and arrangement of parts, it is to be understood that the invention is not limited thereto except as may be pointed out in the appended claim.

I claim as my invention:

In combination, a bin provided with a discharge chute, a swinging gate of the undercut type closing the end of said chute, a catch device connected to said gate, said catch device comprising a rod located above and extending transversely of said gate and side frames pivoted to said rod and each including an arm pivoted to a side of said chute and an arm pivoted to a side member of said gate, a scale car, a reversible shaft on said scale car, a crank arm on said shaft, and a jaw member pivoted to said crank arm and capable of limited swinging movement relative thereto, said jaw member being adapted for engagement with said catch device.

In testimony that I claim the foregoing as my invention, I affix my signature this 13th day of May, A. D. 1927.

ARTHUR J. BOYNTON.